United States Patent [19]

Yamamoto et al.

[11] Patent Number: 5,270,375

[45] Date of Patent: * Dec. 14, 1993

[54] POLYARYLENE SULFIDE RESIN

[75] Inventors: Naoki Yamamoto, Hiroshima; Akira Yanagase, Otake; Hiroshi Mori, Hiroshima; Akira Nakata, Otake, all of Japan

[73] Assignee: Mitsubishi Rayon Co., Ltd., Tokyo, Japan

[*] Notice: The portion of the term of this patent subsequent to Mar. 9, 2008 has been disclaimed.

[21] Appl. No.: 967,543

[22] Filed: Oct. 27, 1992

Related U.S. Application Data

[63] Continuation of Ser. No. 431,040, Nov. 3, 1989, abandoned.

[30] Foreign Application Priority Data

Nov. 4, 1988 [JP] Japan ................................. 63-278969

[51] Int. Cl.$^5$ ............................................. C08K 3/40
[52] U.S. Cl. .................................... 524/500; 524/492; 524/495; 525/474; 525/479; 525/537
[58] Field of Search ............. 524/492, 495, 500; 525/474, 479, 537

[56] References Cited

U.S. PATENT DOCUMENTS

| | | | |
|---|---|---|---|
| 4,450,266 | 5/1984 | Idel et al. | 525/464 |
| 4,581,411 | 4/1986 | Liang et al. | |
| 4,797,448 | 1/1989 | Liang | 525/106 |
| 4,868,240 | 9/1989 | Ichikawa et al. | 525/537 |
| 4,894,415 | 1/1990 | Sasaki et al. | 525/479 |
| 5,011,887 | 4/1991 | Sasaki et al. | 525/63 |

FOREIGN PATENT DOCUMENTS

| | | |
|---|---|---|
| 0090922 | 10/1983 | European Pat. Off. . |
| 0142825 | 5/1985 | European Pat. Off. . |
| 231776 | 8/1987 | European Pat. Off. . |
| 308198 | 3/1989 | European Pat. Off. ............ 525/479 |
| 0332188 | 9/1989 | European Pat. Off. . |
| 2273044 | 12/1975 | France . |
| 56-118456 | 9/1981 | Japan . |
| 58-154757 | 9/1983 | Japan . |
| 59-207921 | 11/1984 | Japan . |
| 60-120753 | 6/1985 | Japan . |
| 61-21156 | 1/1986 | Japan . |
| 62-151460 | 7/1987 | Japan . |

OTHER PUBLICATIONS

Derwent Publications Ltd., English Abstract of JP-A-57 040,557, Mar. 1982.

Primary Examiner—John C. Bleutge
Assistant Examiner—Helen F. Lee
Attorney, Agent, or Firm—Cushman, Darby & Cushman

[57] ABSTRACT

A polyarylene sulfide resin composition comprising 60-99 parts by weight of a polyarylenesulfide resin (A), 40-1 parts by weight of a polyorganosiloxane graft copolymer (B) prepared by grafting a vinyl monomer on a polyorganosiloxane rubber having a degree of swelling in a range of 3-50 measured using toluene as a solvent and an average particle size in a range of 0.15 μm-0.5 μm and being copolymerized with a graft-linking agent, where the total amount of the (A) component and the (B) component is 100 parts by weight, and 0-150 parts by weight of a reinforcing filler (C). A polyarylene sulfide resin composition according to the present invention is excellent in impact resistance, heat resistance, mechanical strength and moldability and useful for an engineering plastic.

7 Claims, No Drawings

POLYARYLENE SULFIDE RESIN

This is a continuation of application Ser. No. 07/431,040, filed on Nov. 3, 1989, which was abandoned upon the filing hereof.

The present invention relates to a polyarylene sulfide resin composition having improved impact resistance. More particularly, the present invention relates to a polyarylene sulfide resin composition excellent in impact resistance, heat resistance and the like comprising a polyarylene sulfide resin, a particular polyorganosiloxane-type graft copolymer and, if necessary, a reinforcing filler.

A polyarylene sulfide resin composition of the present invention is used for electrical and electronic parts, mechanical parts and the like, particularly for surface mounting conectors requiring heat resistance and toughness.

Polyarylene sulfide resins have recently attracted one's attention as engineering plastics having excellent heat resistance and chemical resistance. The conventional polyarylene sulfide resins, however, have significant drawbacks in that they are fragile and inferior in ductility.

Recently, there has been developed a linear polyarylene sulfide resin which is unlike the conventional heat-crosslinkable polyarylene sulfide resins. However, the linear polyarylene sulfide resin is poor in toughness in a crystalline state for the present.

Although a filler such as glass fiber or the like has been heretofore mixed with a polyarylene sulfide resin in order to improve impact resistance thereof, satisfactory results have not yet been obtained.

Also, methods of adding various rubber components are disclosed as measures to improve toughness in Japanese Patent Application Kokai No. 56-118456, 58-154757, 59-207921, 60-120753, 61-21156 and 62-151460. However, a molding temperature of a polyarylene sulfide resin is a high temperature of 300° C. or more. In such a high temperature range, ordinary diene-type and olefin-type rubber components are deteriorated on account of heat and hard to contribute to the improvement of impact resistance. Further, a method of blending a highly heat-resistant silicone rubber is disclosed in the above-mentioned Japanese Patent Application Kokai No. 60-120753. This method comprises mixing particles obtained by pulverizing mechanically a crosslinked rubber with a polyarylene sulfide resin. However, since the dispersibility of the rubber particles is low, the method is hard to sufficiently contribute to the improvement of impact resistance.

The present inventors have eagerly investigated a method for maintaining excellent heat resistance and mechanical strength which a polyarylene sulfide resin inherently has as they are and improving impact resitance. As a result, it is found that a resin composition having a remarkably improved impact resistance and excellent in heat resistance, mechanical strength, moldability and the like can be obtained by mixing a polyarylene sulfide resin with a polyorganosiloxane-type graft copolymer prepared by grafting a vinyl monomer on a polyorganosiloxane rubber having a particular degree of swelling and an average particle size.

The present invention relates to a polyarylene sulfide resin composition comprising 60-99 parts by weight of a polyarylene sulfide resin (A), 40-1 parts by weight of a polyorganosiloxane graft copolymer (B) prepared by grafting a vinyl monomer on a polyorganosiloxane rubber having a degree of swelling in a range of 3-50 measured using toluene as a solvent and an average particle size in a range of 0.15 μm-0.5 μm and being copolymerized with a graft-linking agent, where the total amount of the (A) component and the (B) component is 100 parts by weight, and 0-150 parts by weight of a reinforcing filler (C).

An object of the present invention is to provide a polyarylene sulfide resin composition excellent in impact resistance, heat resistance, mechanical strength, moldability and the like.

Other objects and advantages will become apparent from the following description.

Polyarylene sulfide resins (A) include copolymers each having both a unit represented by the following general formula (I-a) and a unit represented by the following general formula (I-b), and mixture of two or more thereof:

  (I-a)

  (I-b)

where each of $Ar^1$ and $Ar^2$ is independently

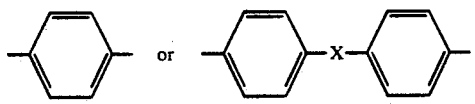

, where X is $-SO_2-$, $-CO-$, $-O-$ or an alkylene group having 5 or less carbon atom. In the general formulas (I-a) and (I-b), an aromatic ring can have 1-3 halogen atoms or a methyl group as a substituent(s). The alkylene groups each having 5 or less carbon atoms include a methylene group, polymethylene groups having 2-5 carbon atoms, the methylene and polymethylene groups each of which has one or two methyl groups on its chain and has 5 or less carbon atoms in total.

Of polyarylene sulfide resins (A) mentioned above, polyphenylene sulfide resin is preferably used.

A polyorganosiloxane graft copolymer (B) is a graft copolymer which is prepared by grafting a vinyl monomer on a polyorganosiloxane rubber having a degree of swelling in a range of 3-50 measured using toluene as a solvent and an average paricle size in a range of 0.15 μm-0.5 μm and being copolymerized with a graft-linking agent.

An amount of a polyorganosiloxane rubber used in the polyorganosiloxane graft copolymer is preferably in a range of 5-90% by weight.

A polyorganosiloxane rubber is prepared from an organosiloxane, a graft-linking agent and a crosslinking agent.

Organosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These organosiloxanes are used alone or in admixture of two or more.

An amount of an organosiloxane is 50% by weight or more, preferably 70% by weight or more based on the polyorganosiloxane rubber.

Graft-linking agents include organosiloxane compounds capable of forming units represented by the general formulas (II), (III) and (IV):

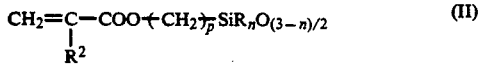 (II)

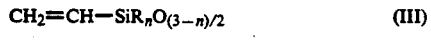 (III)

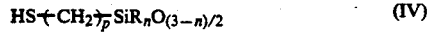 (IV)

where R is a methyl group, an ethyl group, a propyl group or a pheynl group; $R^2$ is a hydrogen atom or a methyl group; n is 0, 1 or 2; p is an integer of from 1 to 6; and when n is 2, two R's can be the same as or different from each other. These graft-linking agents are used alone or in admixture of two or more.

An amount of a graftlinking agent is in a range of 0.1-20% by weight, preferably 0.1-10% by weight based on the polyorganosiloxane rubber.

As crosslinking agents, trifunctional or tetrafunctional siloxanes, preferably trialkoxysilanes or tetraalkoxysilanes can be used. Trialkoxysilanes and tetraalkoxysilanes include trimethoxymethylsilane, triethoxyphenylsilane, tetramethoxysilane, tetraethoxysilane, tetrabutoxysilane and the like.

An amount of a crosslinking agent is in a range of 0.2-30% by weight based on a polyorganosiloxane rubber. The amount should be, however, controlled so that a degree of swelling of the polyorganosiloxane rubber may be in a range of 3-50. When a degree of swelling is less than 3, rubber elasticity cannot be exhibited because of too much crosslinking agent. Also, when a degree of swelling is more than 50, a polyorganosiloxane graft copolymer cannot assume the form of rubber and hence have impact resistance. When such a graft copolymer is mixed with a polyarylene sulfide resin, only the same effect is obtained as when a polyorganosiloxane oil is merely added to the polyarylene sulfide resin.

A degree of swelling is defined as a proportion by weight of toluene absorbed by a polyorganosiloxane rubber when the polyorganosiloxane rubber is swollen by toluene at 25° C., and is measured as follows:

A polyorganosiloxane rubber latex obtained by polymerization is added to about 3-5 parts by volume, based on the latex, of isopropyl alcohol with stirring. An emulsion is broken and subjected to aggregation. Thereby is obtained a siloxane polymer. The obtained polymer is washed with water and thereafter dried at 80° C. for 10 hours at a reduced pressure. Thereafter, about 1 g of the polymer is weighed exactly and then immersed in about 60 g of toluene. The polymer is allowed to stand at 25° C. for 100 hours to be swollen. The residual toluene is removed by decantation.

The swollen polymer is weighed exactly and then dried at 80° C. for 16 hours at a reduced pressure to evaporate absorbed toluene. The dried polymer is weighed exactly. A degree of swelling is calculated according to the following equation:

[Degree of swelling] =

$$\frac{[\text{Weight of swollen Polymer}] - [\text{Weight of dried polymer}]}{[\text{Weight of dried polymer}]}$$

A polyorganosiloxane rubber can be prepared, for example, according to methods disclosed in U.S. Pat. No. 2,891,920 and U.S. Pat. No. 3,294,725.

A polyorganosiloxane rubber is preferably prepared by shearing and mixing with water a mixed solution of an organosiloxane, a graft-linking agent and a crosslinking agent in the presence of an emulsifying agent such as an alkylbenzenesulfonic acid, an alkylsulfonic acid or the like and thereafter subjecting the resulting mixture to polymerization. An alkylbenzenesulfonic acid is preferably used as an emulsifying agent since it serves as a polymerization initiator as well as an emulsifier. At this time, a metal alkylbenzenesulfonate or a metal alkylsulfonate is preferably used in combination with the above-mentioned emulsifying agent since it has an effect on maintaining a latex stable when conducting graft polymerization.

An average particle size of a polyorganosiloxane rubber is in a range of 0.15 μm-0.5 μm, preferably 0.15 μm-0.3 μm. When the average particle size is less than 0.15 μm or more than 0.5 μm, the obtained polyorganosiloxane graft copolymer is inferior in impact resistance. The average particle size can be freely controlled by changing the conditions of shearing and mixing before the polymerization.

The average particle size is measured using a sample liquid obtained by diluting the obtained polyorganosiloxane rubber latex with water, according to quasi-elastic light scattering method (measuring apparatus: MALVERN SYSTEM 4600; measurement temperature: 25° C.; scattering angle: 90°).

As vinyl monomers which are grafted on a polyorganosiloxane rubber, there are preferably used a monoalkenyl aromatic monomers alone or in combination with (meth)acrylonitrile. Monoalkenyl aromatic monomers include styrene, α-methylstyrene and derivatives of them. More preferably, there are used styrene alone or acrylonitrile in combination with at least one selected from the group consisting of styrene, α-methylstyrene and derivatives of them. Derivatives of styrene include vinyltoluene, p-ethylstyrene and the like. Derivatives of α-methylstyrene include p-methyl-α-methylstyrene, p-ethyl-α-methylstyrene and the like.

A composition ratio by weight of a monoalkenyl aromatic monomer and (meth)acrylonitrile is in a range of 100:0-50:50. When a composition ratio by weight is out of the range, expected properties are hard to be obtained.

Also, at this time, 15% by weight or less, based on the total amount of vinyl monomers of another copolymerizable vinyl monomer can be used.

Said another copolymerizable vinyl monomers include (meth)acrylates, maleimide and the like.

An amount of a polyorganosiloxane rubber is in a range of 5-90% by weight and an amount of a vinyl monomer is in a range of 10-95% by weight, based on a polyorganosiloxane graft copolymer. When an amount of a polyorganosiloxane rubber is less than 5% by weight, an improvement in impact resistance is not sufficient. When it is more than 90% by weight, the effect of grafting cannot be exhibited.

A polyorganosiloxane graft copolymer can be prepared according to an ordinary emulsion polymerization method. First, a latex of a polyorganosiloxane rubber is neutralized with an alkali. Thereafter, a vinyl monomer is grafted on the polyorganosiloxane rubber according to a radical polymerization method. Thereby a latex of a polyorganosiloxane graft copolymer is obtained. The latex of the graft copolymer is added to a hot water in which there is dissolved a metal salt such as calcium chloride, magnesium sulfate or the like. The polyorganosiloxane graft copolymer can be isolated and recovered by salting-out and aggregation, and thereafter is dried. The obtained polyorganosiloxane graft copolymer is a mixture of the free polymer which is produced by a side reaction of the vinyl monomer with each other in the graft polymerization and the graft polymer in which the vinyl monomer is bonded to the organosiloxane rubber.

A ratio of the bonding of a vinyl compound monomer to the polyorganosiloxane rubber, that is a ratio of grafting, is an important factor of impact-resistant properties of a polyarylenesulfide resin. Graft chains allow a polyarylenesulfide resin to develop an affinity for a polyorganosiloxane rubber. Accordingly, a ratio of grafting is 10% or more, preferably 30% or more.

It cannot be helped that a free polymer is partly formed in the graft polymerization, which is not bonded to the polyorganosiloxane rubber. However, the amount of the free polymer is preferred to be as small as possible in points of moldability and fluidity.

A proportion in which molecules of a vinyl monomer take part in graft polymerization, that is a graft efficiency, largely depends upon a type of a graft-linking agent copolymerized with a polyorganosiloxane rubber. When an organosiloxane compound capable of forming a unit represented by the above-mentioned general formula (II), (III) or (IV) is used as a graft-linking agent, a graft efficiency is highest and impact resistance is greatly improved.

In the resin composition of the present invention, a component (A) and a component (B) can be combined with each other in a various proportion. However, the resin composition preferably comprises 60-99% by weight of a polyarylene sulfide (A) and 40-1% by weight of a polyorganosiloxane graft copolymer (B), based on the weight of all the resin components in the resin composition.

When an amount of a component (A) is less than 60% by weight, heat resistance is not sufficient. When an amount of a component (B) is less than 1% by weight, impact resistance is not sufficient. Also, when an amount of a component (B) is more than 40% by weight, mechanical strength is inferior and hence the resin composition is hard to be fit for use since the content of the polyorganosiloxane rubber is too high.

The resin composition of the present invention is excellent in heat resistance, impact resistance, particularly impact resistance at a low temperature and fluidity. Impact resistance can be freely controlled by changing loads of a component (B).

The resin composition of the present invention can comprise 0-150 parts by weight of a reinforcing filler (C) based on the total amount (that is 100 parts by weight) of a component (A) and a component (B).

Reinforcing fillers include fibrous reinforcing agents such as glass fiber, carbon fiber, potassium titanate, asbestos, silicon carbide, ceramics fibers, metal fibers, silicon nitride, aramide fibers and the like; barium sulfate, calcium sulfate, kaolin, clay, pyrophyllite, bentonite, sericite, mica, talc, atarpargite, wollastonite, PMF, ferrite, calcium silicate, calcium carbonate, magnesium carbonate, dolomite, antimony trioxide, zinc oxide, titanium oxide, magnesium oxide, iron oxide, molybdenum disulfide, graphite, gypsum, glass beads, glass balloon, quartz powder and the like. Preferably, there are used glass fiber and/or carbon fiber.

A reinforcing filler can further improve impact resistance.

Incidentally, a known silane coupling agent can be used when a reinforcing filler is mixed.

Also, the resin composition of the present invention can comprise a small amount of a mold releasing agent, a coloring agent, a heat stabilizer, an ultraviolet light stabilizer, a blowing agent, a rust preventive, a flame retarder, a flame retarder assistant or the like within the scope of the objects of the present invention.

The present invention is explained more specifically below referring the following Referential Examples, Examples and Comparative Examples. However the present invention should not be construed to be restricted to the Examples.

In the following Examples and Comparative Examples, physical properties were measured according to the following method:

Izod impact strength: ASTM D 256 (with $\frac{1}{4}$" notch)

Heat distortion temperature: ASTM D 648 (under a load of 18.56 kg)

REFERENTIAL EXAMPLE 1

PRODUCTION OF POLYORGANOSILOXANE GRAFT COPOLYMER S-1

2 parts by weight of tetraethoxysilane, 4 parts by weight of γ-mercaptopropyltrimethoxysilane and 94 parts by weight of octamethylcyclotetrasiloxane were mixed to obtain 100 parts by weight of a mixed siloxane. 1 part by weight of sodium dodecylbenzenesulfonate and 1 part by weight of dodecylbenzenesulfonic acid were dissolved in 300 parts by weight of distilled water. To the aqueous solution was added 100 parts by weight of the above mixed siloxane. The obtained mixture was preliminarily stirred at 10,000 rpm in a homomixer. The mixture was allowed to pass through a homogenizer three times at a pressure of 200 kg/cm$^2$ to emulsify the mixed siloxane. Thereby an organosiloxane latex was obtained. The latex was transferred to a separable flask equipped with a condenser and a stirrer. The latex was heated at 80° C. for 5 hours with stirring and then cooled to 10° C. and held in this condition for 20 hours. The latex was neutralized at pH 6.9 with an aqueous sodium hydroxide to complete the reaction. A conversion in the polymerization of polyorganosiloxane rubber was 90.8% and a degree of swelling thereof was 23. An average particle size thereof was 0.24 μm.

264 parts by weight of the obtained polyoragnosiloxane rubber latex was charged in a separable flask equipped with a stirrer. The atmosphere in the flask was replaced by nitrogen. The polyorganosiloxane rubber latex was heated at 70° C. Therein was charged the mixed solution of 28 parts by weight of styrene, 12 parts by weight of acrylonitrile and 0.16 parts by weight of tertiary-butyl peroxide and stirred for 30 minutes. Further therein was charged the mixed solution of 0.2 part by weight of Rongalit (made by Wako Pure Chemical Industries, Ltd.), 0.0004 part by weight of ferrous sulfate, 0.0008 part by weight of disodium ethylenediaminetetraacetate and 5 parts by weight of distilled water to start radical polymerization. A reaction temperature was kept at 70° C. for 3 hours and then cooled to complete the radical polymerization. A conversion in the polymerization of styrene and acrylonitrile was 96% in graft polymerization. A ratio of grafting of the obtained graft copolymer was 52% and a graft efficiency thereof was 78%. The obtained latex was added droppwise to 456 parts by weight of hot water containing 1.5% by weight of calcium chloride. Thereby the graft copolymer was aggregated, separated and washed. Thereafter the graft copolymer was dried at 75° C. for 10 hours to remove water. Dry powder of the graft copolymer (S-1) was obtained.

REFERENTIAL EXAMPLE 2

PRODUCTION OF POLYORGANOSILOXANE GRAFT COPOLYMERS S-2–S-5

A polyorganosiloxane rubber was prepared in the same manner as in Referential Example 1. Vinyl monomers of a composition shown in Table 1 were grafted on the polyorganosiloxane rubber in the same conditions except for temperatures as in Referential Example 1. Dry powders S-2–S-5 were obtained by aggregation and drying the graft polymer.

REFERENTIAL EXAMPLE 3

PRODUCTION OF POLYORGANOSILOXANE GRAFT COPOLYMERS S-6–S-14

A polyorganosiloxane rubber was prepared in the same conditions as in Referential Example 1 except for conditions shown in Table 2. The polyorganosiloxane rubber was subjected to graft polymerization in the same conditions as in Referential Example 1. Various graft copolymers S-6–S-14 were obtained in the form of powder by aggregation and drying.

TABLE 1

|  | S-2 | S-3 | S-4 | S-5 |
|---|---|---|---|---|
| Vinyl monomer (parts by weight) | Styrene 24 Acrylonitrile 16 | α-Methylstyrene 28 Acrylonitrile 12 | Styrene 14 α-Methylstyrene 14 Acrylonitrile 12 | Styrene 40 |
| Polymerization temperature (°C.) | 70 | 80 | 70 | 70 |
| Conversion of vinyl monomer (%) | 95 | 92 | 94 | 95 |
| Ratio of grafting | 50 | 47 | 50 | 53 |

TABLE 2

|  | S-6 | S-7 | S-8 | S-9 | S-10 | S-11 | S-12 | S-13 | S-14 |
|---|---|---|---|---|---|---|---|---|---|
| Tetraethoxysilane (parts by weight) | 2 | 2 | 3 | 2 | 1 | 5 | 2 | 2 | 3 |
| Type and amount of graft-linking agent (parts by weight) | γ-Mercaptopropyltrimethoxysilane 4 | " | " | " | " | " | γ-Methacryloyloxypropyltrimethoxysilane 4 | Vinyltrimethoxysilane 4 | None |
| Octamethylcyclotetrasiloxane (parts by weight) | 94 | 94 | 94 | 94 | 95 | 91 | 94 | 94 | 97 |
| Pressure in a homogenizer (kg/cm$^2$) | 200 | 200 | 100 | 350 | 200 | 200 | 200 | 200 | 200 |
| Number of times of passing through a homogenizer | 1 | 5 | 1 | 5 | 3 | 3 | 3 | 3 | 3 |
| Conversion of polyorganosiloxane rubber (%) | 91 | 91 | 91 | 90 | 91 | 91 | 91 | 91 | 91 |
| Degree of swelling of polyorganosiloxane rubber | 22 | 23 | 23 | 23 | 37 | 9 | 22 | 23 | 27 |
| Average particle size of polyorganosiloxane rubber (μm) | 0.26 | 0.20 | 0.33 | 0.13 | 0.24 | 0.24 | 0.24 | 0.24 | 0.24 |

REFERENTIAL EXAMPLE 4

PRODUCTION OF POLYORGANOSILOXANE GRAFT COPOLYMERS S-15–S-18

Polyorganosiloxane rubbers were prepared in the same conditions as in Referential Example 1 except for conditions shown in Table 3 and subjected to graft polymerization in the same manner as in Referential Example 1. Various graft copolymers S-15–S-18 were obtained in the form of powder by aggregation and drying.

TABLE 3

|  | S-15 | S-16 | S-17 | S-18 |
|---|---|---|---|---|
| Tetraethoxysilane (parts by weight) | 2 | 2 | 2 | 2 |
| Type and amount of graft-linking agent (parts by weight) | γ-Methacryloyloxypropylmethyldimethoxysilane 4 | δ-Mercaptobutyltriethoxysilane 4 | δ-Methacryloyloxybutyltrimethoxysilane 4 | γ-Methacryloyloxypropyltrimethoxysilane 2 γ-Mercaptopropyltrimethoxysilane 2 |
| Octamethylcyclotetrasiloxane (parts by weight) | 94 | 94 | 94 | 94 |
| Pressure in a homogenizer (kg/cm$^2$) | 200 | 200 | 200 | 200 |
| Number of times of passing through a homogenizer | 1 | 1 | 1 | 1 |
| Conversion of polyorganosiloxane rubber (%) | 91 | 91 | 91 | 91 |
| Degree of swelling of polyorganosiloxane rubber | 26 | 22 | 23 | 22 |
| Average particle size of | 0.26 | 0.26 | 0.26 | 0.26 |

TABLE 3-continued

| | S-15 | S-16 | S-17 | S-18 |
|---|---|---|---|---|
| polyorganosiloxane rubber (μm) | | | | |

EXAMPLES 1-12 and COMPARATIVE EXAMPLES 1-5

The polyorganosiloxane graft copolymers S-1–S-5 obtained in Referential Examples 1 and 2 were blended with polyphenylene sulfide (Ryton R-6 made by Phillips Petroleum Co.), glass fiber and carbon fiber respectively in the proportions shown in Table 4. The mixture were extruded, pelletized and then injection molded to obtain variuous sample pieces. Using these sample pieces, various physical properties were measured. Results are shown in Table 4.

In Comparative Examples, polyphenylenesulfide (Ryton R-6) alone was compounded with glass fiber or carbon fiber and molded by injection to obtain various sample pieces. Results of measurements using these sample pieces are shown in Table 4, too.

In Table 4, GF and CF represent glass fiber and carbon fiber, respectively.

TABLE 4

| | Example 1 | Example 2 | Example 3 | Example 4 | Example 5 | Example 6 | Example 7 | Example 8 | Example 9 |
|---|---|---|---|---|---|---|---|---|---|
| Polyorgano-siloxane graft copolymer (parts by weight) | S-1 16.6 | S-1 4.2 | S-1 8.3 | S-1 16.6 | S-1 25 | S-1 16.6 | S-1 16.6 | S-1 16.6 | S-2 16.6 |
| Polyphenylene sulfide (parts by weight) | 83.4 | 95.8 | 91.7 | 83.4 | 75 | 83.4 | 83.4 | 83.4 | 83.4 |
| Reinforcing filler (parts by weight) | — | GF 67 | GF 67 | GF 67 | GF 67 | GF 43 | GF 150 | CF 43 | GF 67 |
| Izod impact strength with ¼" notch at 23° C. (kg·cm/cm) | 8 | 11 | 14 | 17 | 19 | 14 | 12 | 12 | 16 |
| Heat distortion temperature (°C.) | 115 | 261 | 259 | 255 | 235 | 251 | 258 | 249 | 255 |

| | Example 10 | Example 11 | Example 12 | Comparative Example 1 | Comparative Example 2 | Comparative Example 3 | Comparative Example 4 | Comaprative Example 5 |
|---|---|---|---|---|---|---|---|---|
| Polyorgano-siloxane graft copolymer (parts by weight) | S-3 16.6 | S-4 16.6 | S-5 16.6 | — | — | — | — | — |
| Polyphenylene sulfide (parts by weight) | 83.4 | 83.4 | 83.4 | 100 | 100 | 100 | 100 | 100 |
| Reinforcing filler (parts by weight) | GF 67 | GF 67 | GF 67 | — | GF 43 | GF 67 | GF 150 | CF 43 |
| Izod impact strength with ¼" notch at 23° C. (kg·cm/cm) | 13 | 14 | 16 | 2 | 7 | 8 | 6 | 3 |
| Heat distortion temperature (°C.) | 256 | 255 | 255 | 130 | 263 | 265 | 265 | 259 |

EXAMPLES 13-19 and COMPARATIVE EXAMPLES 6-7

The polyorganosiloxane graft copolymers S-6–S-14 obtained in Referential Example 3 were blended with polyphenylene sulfide (the above-mentioned Ryton R-6) and GF respectively in the proportions shown in Table 5. The mixture were extruded, pelletized and injection molded to obtain various sample pieces. Various physical properties were measured using these sample pieces. Results are shown in Table 5.

TABLE 5

| | Example 13 | Example 14 | Example 15 | Example 16 | Example 17 | Example 18 | Example 19 | Comparative Example 6 | Comparative Example 7 |
|---|---|---|---|---|---|---|---|---|---|
| Polyorgano-siloxane graft copolymer (parts by weight) | S-6 16.6 | S-7 16.6 | S-8 16.6 | S-10 16.6 | S-11 16.6 | S-12 16.6 | S-13 16.6 | S-9 16.6 | S-14 16.6 |
| Polyphenylene sulfide (parts by weight) | 83.4 | 83.4 | 83.4 | 83.4 | 83.4 | 83.4 | 83.4 | 83.4 | 83.4 |

TABLE 5-continued

|  | Example 13 | Example 14 | Example 15 | Example 16 | Example 17 | Example 18 | Example 19 | Comparative Example 6 | Comparative Example 7 |
| --- | --- | --- | --- | --- | --- | --- | --- | --- | --- |
| GF (parts by weight) | 67 | 67 | 67 | 67 | 67 | 67 | 67 | 67 | 67 |
| Izod impact strength with 1/4" notch at 23° C. (kg · cm/cm) | 15 | 14 | 15 | 15 | 13 | 14 | 14 | 9 | 6 |
| Heat distortion temperature (°C.) | 255 | 255 | 255 | 255 | 255 | 255 | 255 | 255 | 255 |

EXAMPLES 20-23

The polyorganosiloxane graft copolymers S-15–S-18 obtained in Referential Example 4 were blended with polyphenylene sulfide (Ryton R-6) and glass fiber respectively in the proportions shown in Table 6. The mixtures were extruded, pelletized and injection molded. Physical properties thereof were measured. Results are shown in Table 6.

TABLE 6

|  | Example 20 | Example 21 | Example 22 | Example 23 |
| --- | --- | --- | --- | --- |
| Polyorganosiloxane graft copolymer (parts by weight) | S-15 16.6 | S-16 16.6 | S-17 16.6 | S-18 16.6 |
| Polyphenylene sulfide (parts by weight) | 83.4 | 83.4 | 83.4 | 83.4 |
| GF (parts by weight) | 67 | 67 | 67 | 67 |
| Izod impact strength with 1/4" notch at 23° C. (kg · cm/cm) | 14 | 15 | 14 | 14 |
| Heat distortion temperature (°C.) | 255 | 255 | 255 | 255 |

What is claimed is:

1. A polyarylene sulfide resin composition comprising
    75–91.7 parts by weight of a polyarylenesulfide resin (A),
    25–8.3 parts by weight of a polyorganosiloxane graft copolymer (B) prepared by grafting at least one vinyl monomer selected from the group consisting of monoalkenyl aromatic monomers, acrylonitrile and methacrylonitrile on a polyorganosiloxane rubber wherein said polyorganosiloxane rubber has a degree of swelling in a range of 9–37 measured using toluene as a solvent and an average particle size in a range of 0.2 μm–0.33 μm and said polyorganosiloxane rubber is obtained by copolymerizing an organo-siloxane, a graft-linking agent and a crosslinking agent; and where the total amount of the (A) component and the (B) component is 100 parts by weight, and the composition further comprises 0–150 parts by weight of a reinforcing filler (C).

2. A polyarylene sulfide resin composition according to claim 1, wherein the polyarylene sulfide resin (A) is a polyphenylene sulfide resin.

3. A polyarylene sulfide resin composition according to claim 1, wherein the polyorganosiloxane rubber is copolymerized with 0.1–20% by weight of a graft-linking agent.

4. A polyarylene sulfide resin composition according to claim 1, wherein, when said graft-linking agent is copolymerized with the organo-siloxane and the crosslinking agent to produce the polyorganosiloxane rubber, the graft-linking agent forms units in said polyorganosiloxane rubber and said units are selected from the group consisting of compounds represented by the formulas (II), (III) and (IV):

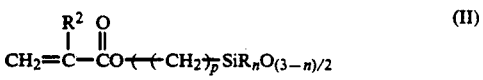

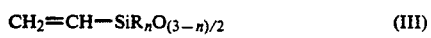

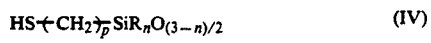

wherein R is amethyl group, an ethyl group, a propyl group or a phenyl group; n is 0, 1 or 2; p is an integer of from 1 to 6; $R^2$ is H or a methyl group; and when n is 2, R's can be the same as or different from each other.

5. A polyarylene sulfide resin composition according to claim 1, wherein a composition ratio by weight of the monoalkenyl aromatic monomer to methacrylonitrile or acrylonitrile is 100:0–50:50 in the vinyl monomer.

6. A polyarylene sulfide resin composition according to claim 1, wherein the reinforcing filler is glass fiber.

7. A polyarylene sulfide resin composition according to claim 1, wherein the reinforcing filler is carbon fiber.

* * * * *